Dec. 13, 1927. 1,652,357
W. D. HARPER
VEHICLE BODY SUPPORT
Filed Nov. 6, 1923
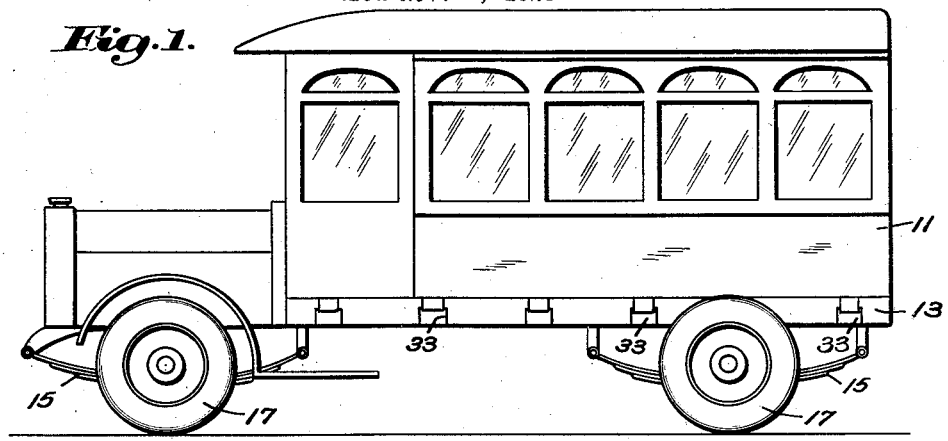
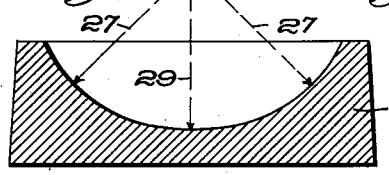
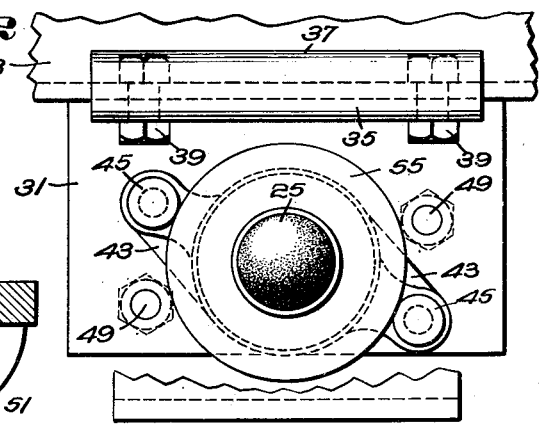
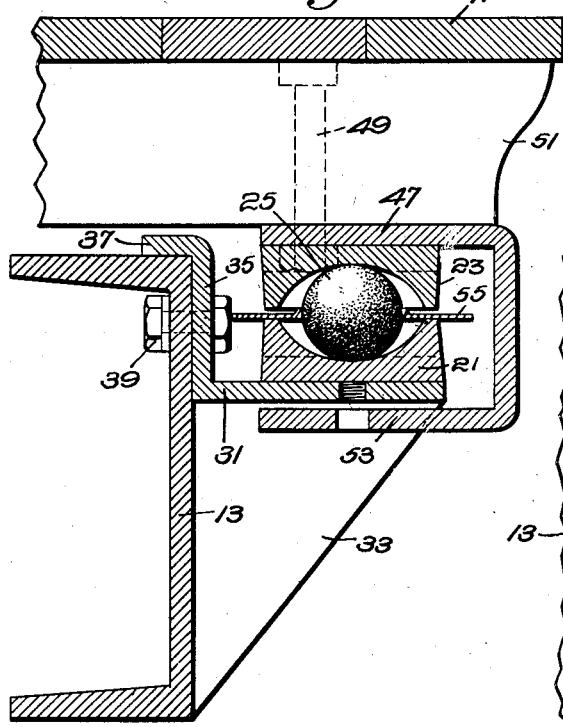
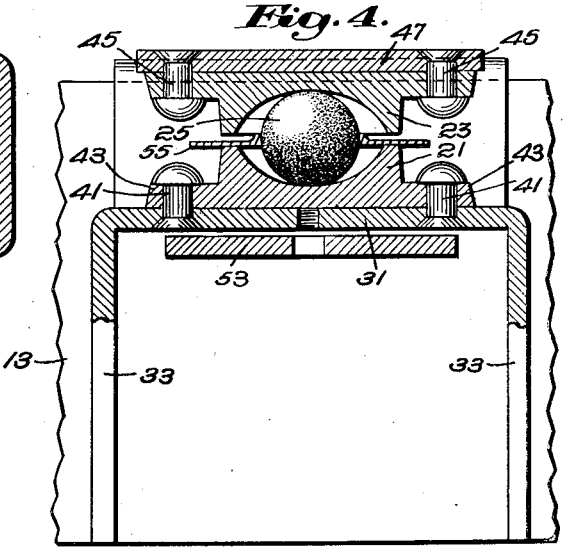
Inventor:
William D. Harper, Patented Dec. 13, 1927.

1,652,357

UNITED STATES PATENT OFFICE.

WILLIAM D. HARPER, OF WALTHAM, MASSACHUSETTS.

VEHICLE-BODY SUPPORT.

Application filed November 6, 1923. Serial No. 673,052.

This invention relates to means for mounting the bodies of automobiles, trailers or similar vehicles upon supporting frames in such manner as to relieve the body and its load of a substantial portion of the effects of shocks or stresses to which the vehicle may be subjected in ordinary road usage, and consists in improvements designed to supply a simplified and efficient form of such mounting.

The invention will be best understood by reference to the following description, when taken in connection with the accompanying illustration of one specific embodiment thereof, while its scope will be more particularly pointed out in the appended claims.

In the drawings,—

Fig. 1 is a side elevation showing, by way of illustration, a motor bus equipped with one form of the invention;

Fig. 2 is a plan view, partly broken away, showing details of one of the supporting units employed between the vehicle body and the chassis;

Fig. 3 is a transverse sectional elevation showing the supporting unit illustrated in Fig. 2 and its relation to the chassis and the body;

Fig. 4 is a longitudinal sectional elevation showing the same parts; and

Fig. 5 is a sectional elevation taken through the lower cup bearing for one of the supporting units showing the same on an enlarged scale and illustrating the variation in curvature.

Referring to the drawings, I have there shown for illustrative purposes the details of one specific embodiment of the invention as applied to an automobile road vehicle, herein a passenger bus, but the invention may be applied, in greatly modified form, to vehicles of various types and widely different constructions. Herein the vehicle has the body 11 supported on the chassis frame 13, the latter being resiliently supported by means of the springs 15 on the wheels 17. The vehicle is provided with the usual means for self propulsion (not herein shown), so that the body and the load carried thereby may be propelled through a force or drawbar pull applied to the chassis and from the chassis by the supporting connections hereinafter described.

In the illustrative embodiment of the invention the body is supported on the chassis frame through the provision of a number of supporting units interposed between the chassis and the body, these units being disposed along opposite sides of the chassis frame and carried by the side members of that frame. Each unit herein comprises a bearing support member 21 secured to the chassis frame and a cooperating bearing rest member 23 secured to the body 11, the two members of each unit being located opposite to one another and so associated as to permit the body-connected bearing member to move laterally over and on the bearing support member either directly or, as herein, indirectly through the interposition of suitable anti-friction rolling members.

These cooperating bearing parts may be constructed in various ways, but herein a simple form of ball bearing is shown having the spherical bearing ball 25, while the lower and upper bearing members 21 and 23 respectively are in the form of oppositely disposed upright and inverted cup shaped races having similar concavities generally spherical in contour but of a radius of curvature greater than the radius of the ball 25. It follows that when the body-connected bearing race 25 is moved laterally in any direction from its normal position at rest, or that in which the ball seats in the deepest parts of the two concavities, the ball rides up the side of the concavity of the bearing support 21 and the bearing member 23 rides up the ball, so that, together with the vehicle body, the member 23 has imparted to it a substantial lift or rising movement.

In the preferred form, as illustrated more in detail in Fig. 5, the bearing surface of each cup is formed with a lesser radius of curvature 27 in its outer portion and with a relatively larger radius of curvature 29 in its central portion. Under these conditions initial displacement of the body takes place readily or with relatively little lift, but, with greater lateral displacement, the body meets with an increasing check as the ball encounters the more sharply curved portions of the body and the lift rapidly increases.

A plurality of such supporting units is shown interposed between the body and the chassis, the number varying with the weight to be carried and the dimensions of the other parts. The several units are preferably similar in construction and contour and are so located as to have the axial lines of opposing bearing cups in coincidence when the body is in its normal position of rest with respect to the chassis, or the position assumed when the chassis is stationary and the wheel base level, with the bearing ball engaging the bottom of the concavity of each cup. There is preferably provided three or more such units, a series being herein shown on each side of the chassis frame, with the body connected bearing rests, comprising the inverted cups 23, secured in a rigid and unvarying relation to the underside of the body, and a similar series of opposed cup bearing supports 21 secured in rigid and unvarying relation to the chassis frame, the latter being arranged to align and cooperate with the bearing members 23 and the interposed balls 25.

Referring first to the bearing support members 21, the latter are herein shown each carried upon a bracket secured at the appropriate point to the side of the chassis frame, said bracket comprising the supporting plate or shelf 31 provided with the two upright triangular brace arms 33 and the face plate 35 having the lip or flange 37 which is adapted to overlap the top of the chassis frame, permitting the bracket to be readily secured to the chassis frame by any suitable means, such as the bolts 39 passing through the face plate. The bearing support 21 is rigidly secured to the lateral shelf 31 of the bracket, as by the rivets 41 passing through the shelf and through oppositely arranged lugs 43 extending from the side of the bearing support.

The inverted cup or bearing rest 23, which may be a duplicate of the bearing support 21, is similarly attached by means of rivets 45 to a plate 47, the latter secured, as by the bolts 49, to the underside of a body member, such as the transverse floor support 51, the latter forming a part of the body frame and projecting laterally slightly beyond the chassis frame while at the same time extending above the same with a relatively slight clearance. In the case of a body provided at each side with a stringer plate extending longitudinally beneath the body, as, for example, beneath the transverse floor support 51, the plate 47 may be secured directly to such stringer plate instead of to the transverse floor member.

With the parts assembled and the body mounted on the chassis through the series of supporting units described, when the chassis is at rest and in a substantially horizontal position, the parts occupy substantially the position shown in Fig. 3. When the vehicle is in operation, however, any change in the the rate or direction of motion, either in starting from a position of rest or increasing or diminishing the speed or in turning a corner or encountering obstacles, will tend to move the body and its load laterally under lateral displacing forces arising from the momentum and inertia of the body and its load, but the shocks consequent of such displacing forces will be checked, absorbed or minimized by the simultaneous lifting movement of the body and its load which is enforced by the lateral displacing movement of the upper raceway on the lower one. The weight of the body and its load tends at all times to bring the parts to their normal positions of rest, the body settling back to its normal position as soon as the lateral displacing forces cease or diminish. The parts will be preferably so shaped as to take care of shocks and stresses met with in ordinary conditions of use. Preferably, however, the connections present some means to limit the amount of lateral and lifting movement so that the body cannot be unseated from the chassis by abnormal shocks or stresses. In the illustrated form of the invention this is readily accomplished by forming the plate 47 in the shape of a U so as to present a wall or part 53 underlying the shelf 31 with a sufficient clearance in the normal position at rest to allow the necessary lift of the body, but preventing (through engagement with the underside of the shelf) any abnormal lift beyond that point.

Each of the bearing units is preferably provided with means for excluding dust or other foreign matter from the bearings, such, for example, as the dust plate 55, consisting of a disk centrally perforated to drop over the ball 25 and rest on the flat face of the race 21 with sufficient overlap to cover the concave surface of the bearing support as the disk moves from side to side with the movement of the ball.

The supporting brackets not only provide a rigid unyielding support for their respective supporting units which can be applied to the sides of the chassis frame with great facility, but, by bringing the support for the supporting unit below the level of the top of the chassis frame, a clearance between the chassis frame and the overlying part of the body may be minimized and be made substantially less than the height of the supporting unit, and the body dropped to a substantially lower level. In the illustrated form of the invention the parts constituting the supporting unit may be made strong and substantial without adding anything to the total height of the vehicle, except what slight clearance may be desired between the chassis frame and the body.

While I have herein shown for the purposes of illustration one specific embodiment of the invention, it is to be understood that the same is not limited to the details herein shown, but that various modifications and changes in the form and relative arrangement of parts may be made, all without departing from the spirit thereof.

Claims:

1. In a road vehicle, the combination with a vehicle body, of a chassis frame comprising opposite longitudinal side members, means for supporting the body with a slight clearance above the chassis frame while permitting the movement of the body horizontally in all directions with relation thereto, the same comprising a series of spaced supporting units disposed at different points between the body and the frame, each unit having a concaved, cup-shaped bearing rest rigidly secured to the under side of the body, a complementary bearing seat secured to the chassis with an interposed ball member of lesser size than the size of the concavities of said cups and arranged to move about therein, said cup members presenting inclined surfaces over which the ball may ride on a relative movement of the bearing cups in any direction, either fore and aft or laterally, whereby movement of the body from its normal position in any horizontal direction relative to the chassis is accompanied by a consequent equal lift of all parts of the body in the course of such movement, said bearing seats being rigidly related to the chassis frame and supported below the level of the top of the chassis frame and the supporting units having a height greater than that of the clearance between the chassis frame and the overlying body member, whereby a universal, lateral lift support may be provided on the chassis permitting the movement of the body with a minimum clearance and a minimum height for the center of gravity thereof.

2. In a road vehicle, the combination with a vehicle body, of a chassis frame comprising opposite longitudinal side members, means for supporting the body with a slight clearance above the chassis frame while permitting the movement of the body horizontally in all directions with relation thereto, the same comprising a series of spaced supporting units disposed at different points between the body and the frame, each unit having a concaved, cup-shaped bearing rest rigidly related to the under side of a body member, a bed plate secured to the bearing rest and fastened to the under side of the body member, the latter overlying and extending beyond the sides of the chassis frame, a complementary bearing seat rigidly related to the chassis, a supporting plate on which the bearing seat is rigidly secured, said plate being fastened to the side of the chassis frame and below the top thereof, an interposed ball member of lesser size than the size of the concavities of said cups and arranged to move about therein, said cup members presenting inclined surfaces over which the ball may ride on a relative movement of the bearing cups in any direction, either fore and aft or laterally, whereby movement of the body from its normal position in any horizontal direction relative to the chassis is accompanied by a consequent equal lift of all parts of the body in the course of such movement, the supporting unit having a height greater than that of the clearance between the chassis frame and the overlying body member, and a limiting device rigidly related to the bedplate and extending down and in engaging relation to the underlying supporting plate but with a slight clearance in the normal position of the body, said limiting device being so related to the supporting plate that before the body can lift to permit the unseating of the ball from its bearing seat, the limiting device is brought into operation.

In testimony whereof, I have signed my name to this specification.

WILLIAM D. HARPER.